United States Patent [19]

Liu et al.

[11] Patent Number: 4,704,084
[45] Date of Patent: Nov. 3, 1987

[54] $NO_X$ REDUCTION IN MULTISOLID FLUIDIZED BED COMBUSTORS

[75] Inventors: Ke-tien Liu; Herman Nack, both of Columbus, Ohio

[73] Assignee: Battelle Development Corporation, Columbus, Ohio

[21] Appl. No.: 106,745

[22] Filed: Dec. 26, 1979

[51] Int. Cl.[4] .............................................. F23D 19/00
[52] U.S. Cl. ....................................... 431/7; 122/4 D; 432/15; 423/244; 423/DIG. 16; 48/197 R; 110/347
[58] Field of Search ....................... 431/7, 170; 432/15, 432/58; 122/4 D; 110/342, 245, 263, 347; 34/51 R, 51 A; 40/197 R, 210, 206; 34/10; 423/244 A, DIG. 16

[56] References Cited

U.S. PATENT DOCUMENTS

| | | | |
|---|---|---|---|
| 4,017,272 | 4/1977 | Anwer et al. | 48/210 |
| 4,021,184 | 5/1977 | Priestly | 431/7 |
| 4,084,545 | 4/1978 | Nack et al. | 122/4 D |
| 4,103,646 | 8/1978 | Yerushalmi | 122/4 D |
| 4,111,158 | 9/1978 | Reh et al. | 122/4 D |
| 4,154,581 | 5/1979 | Nack et al. | 48/197 R |
| 4,158,701 | 6/1979 | Anderson et al. | 423/DIG. 16 |

OTHER PUBLICATIONS

"Control of $NO_x$ Emissions from Stationary Sources.", Bartok et al., Chemical Engineering Progress, vol. 67, No. 2, p. 64, 1971.
"Fluid Bed Combustion in Processing, Environmental Protection and Energy Supply", by Dr. Reh, paper to the American Flame Research Symposium on International Fluidized Bed Combustion, Boston, Apr. 30, 1979.
"Fluidized Bed Processing", L. Reh, Chemical Engineering Progress, vol. 67, No. 2, pp. 58–63, 1971.

Primary Examiner—Margaret A. Focarino
Attorney, Agent, or Firm—Barry S. Bissell

[57] ABSTRACT

Nitrogen oxide pollutants are substantially reduced and sulfur dioxide minimized in multisolid fluidized beds by staged combustion of the fuel. The lower combustion region is operated at substoichiometric conditions such that $NO_x$ is reduced by carbon and carbon monoxide to nitrogen gas. The upper combustion region is operated at excess oxygen conditions to complete the combustion of char and carbon monoxide. Elevated temperature excursions in the upper region which deter sulfur capture are prevented by recycling cool entrained bed particles therethrough.

10 Claims, 1 Drawing Figure

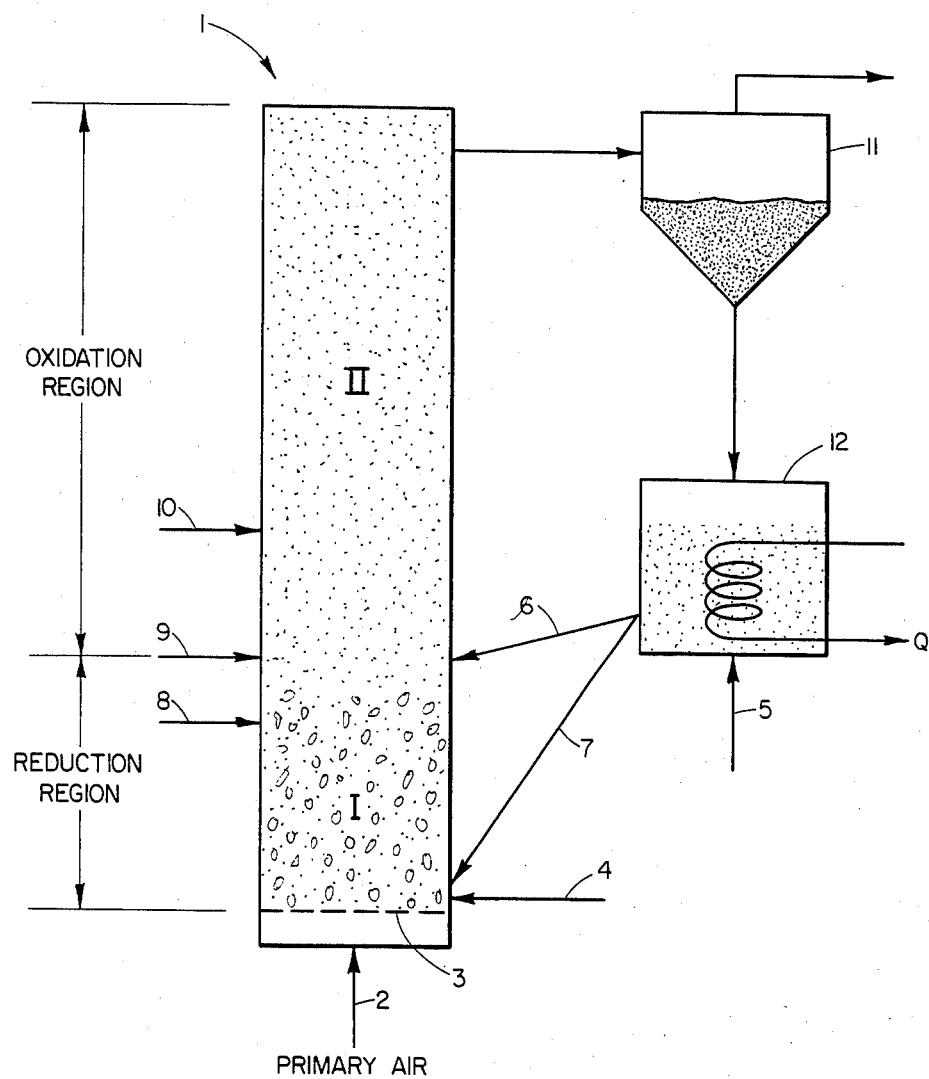

NO$_x$ REDUCTION IN MULTISOLID FLUIDIZED BED COMBUSTORS

BACKGROUND OF THE INVENTION

Federal and state air quality standards on emissions have made it necessary to seek methods of cleaner burning for carbonaceous fuels. Both SO$_2$ and NO$_x$ are legislatively regulated. The differences in the behaviour of these pollutants and the differences in the best available methods for independently eliminating these gases make an existing single-stage combustion process for their co-removal highly unlikely or at least inefficient.

Fluidized bed combustion has developed recently for burning sulfur-bearing, carbonaceous fuels. This is primarily due to the ability to contact the sulfur dioxide reaction product with a sulfur sorbent for a period of time sufficient to capture a high percentage of the sulfur dioxide. Work on nitrogen oxide removal has trailed the work on sulfur oxide capture because of less stringent legislation to this point.

SUMMARY OF THE INVENTION

It is an object of the present invention to provide a method for ridding combustion gases of nitrogen oxide pollutants.

It is also an object of the invention to provide such method in a conventional multisolid fluidized bed combustor.

It is further an object to minimize the sulfur dioxide emissions released during such inventive process.

It is also an object to provide a simple method for optimizing nitrogen and sulfur oxide emissions from a multisolid fluidized bed combustor.

In accordance with the objectives, the invention is a method for lowering nitrogen oxides to a desired level and at the same time minimizing sulfur dioxide in the reaction gases from the combustion of carbonaceous fuel in a multisolid fluidized bed. The multisolid fluidized bed combustor comprises a lower dense fluidized bed of relatively large particles, an upper, dispersed, entrained bed of relatively fine particles recirculating through the dense fluidized bed, and an entrained sulfur sorbent material in the dispersed, entrained bed of fine particles. The inventive method comprises operating a lower region of the fluidized bed under fuel rich or substoichiometric conditions such that the NO$_x$ is reduced to the desired level, operating an upper region of the fluidized bed above the substoichiometric lower region under oxidizing conditions to complete the combustion of the fuel and recycling at least a portion of the cooled, relatively fine particles from the entrained bed through only the upper region which is operating under oxidizing conditions whereby to reduce the temperature of such oxidizing region to a level more conducive to sulfur capture by the sulfur sorbent material. The substoichiometric region is preferably limited to the dense fluidized bed or a substantial portion thereof.

The region of reducing conditions is preferably maintained such that air is about 40-60% of stoichiometric requirements and the region of oxidizing conditions is preferably maintained at about 18% excess air.

The temperature in such fluidized bed varies depending, among other things, on the specific fuel used, but is preferably maintained at a uniform level of about 1600°-1700° F. for most coals and about 1700°-1750° F. for most cokes.

Air for the reducing region is preferably provided by the primary fluidizing gas while oxidizing conditions are preferably provided by introducing secondary air at one or more locations between a point in the dense bed near the upper boundary thereof to a point in the dispersed, entrained bed several feet upwards from the dense bed. The position of the secondary air affects the relative effectiveness of nitrogen oxide reduction and sulfur capture; the higher the entrance of secondary air, the more favorable the nitrogen reduction relative to sulfur capture. The residence time of the gas in the two regions is a significant factor in the completeness of reaction therein.

A portion of the cooled fine particles of the entrained bed are conventionally recycled through the dense bed in order to provide mixing therein. The remainder of the fine particles are recycled through the oxidizing region in order to depress the temperature therein. Backward mixing of the latter fine particles into the dense bed is prevented by maintaining a large relative difference in the sizes of coarse dense bed particles and the fine, entrained bed particles. In particular, it is preferred that substantially all the particles in the dense bed be at least about 4 times the size (diameter) of substantially all the particles in the entrained bed. Specific size ranges are (U.S. Standard sieve size) $-4+16$ (preferably $-6+12$) for the dense bed particles and $-40$ (preferably $-50+200$) for the entrained bed particles.

DETAILED DESCRIPTION OF THE INVENTION

Multisolid fluidized beds have demonstrated the ability to burn sulfur-bearing, carbonaceous fuel at low SO$_2$ pollution levels when a sulfur sorbent such as limestone is contacted with the reaction gases. The method of operating a multisolid fluidized bed is described in detail in our prior U.S. Pat. No. 4,084,545. By this reference we hereby incorporate such patent disclosure herein and we will not further describe the now conventional operation in great detail. The important features to be remembered are a dense, coarse-particle fluidized bed at the lower extreme of the apparatus and a larger entrained bed of finer particles overlapping and recirculating through the dense bed. The fluidizing gas enters at the bottom to fluidize the coarse particles and to entrain the fines. The overlapping dense and fine beds provide thorough mixing for more complete reaction than available in one-component fluidized beds.

Our second U.S. Pat. No. 4,154,581, which is also incorporated herein by reference, describes the operation of such multisolid fluidized beds with two different temperature zones by providing a baffling means in the dense bed and using the recirculation of entrained bed particles to affect the temperature at their point of entry into the dense bed above or below the baffling means. Somewhat larger fine particles were suggested in the latter patent over those preferred in the present inventive method.

The present invention is a further improvement in the operation of multisolid fluidized beds of the type shown in the prior two mentioned patents. The improved operation allows the combustion of sulfur-bearing carbonaceous fuels while remaining substantially below legislated levels of both NO$_x$ and SO$_2$ emissions.

The inventive method can be best understood by looking at the drawing figure wherein a multisolid fluidized bed 1 is shown schematically. In conventional operation a fluidizing gas or primary air 2 enters the combustor at the bottom and passes through distributor plate 3. Fuel and possibly a sulfur sorbent enter at 4. The fuel is generally oil or particulate coal or coke. The sulfur sorbent is conventional and may for example be limestone, lime or dolomite. The sulfur sorbent could also enter at locations 8 or 9 with the secondary air to be later described.

A coarse, particulate material is present in the combustor and is fluidized in the region I shown in the Figure. The size of the coarse component is generally in the range of $-4+16$ mesh (U.S. Standard) and preferably $-6+12$ U.S. mesh. As known in the art, a balance between the particle size and the velocity of the fluidizing gas is necessary to keep the bed fluidized in the region I. The superficial base velocity of the primary gas is generally in the range of about 10-60 feet per second. The coarse component should be stable and inert under the operating conditions. Metal oxides are desirable materials for the dense bed. Iron oxide such as contained in hematite, is preferred though aluminum oxide, silica, or nickel oxide among others may be utilized.

The primary air 2 also entrains a relatively fine particle component in the combustor regions I and II. The entrained fine particles are captured above the combustor by cyclone 11 and are recycled back to the combustor through recycle leg 7 and (in the present invention) also through recycle leg 6. Heat is removed from the entrained fines either by heat exchange tubing within region II in the combustor or preferably through heat exchange tubing in an external heat exchanger 12. A fluidizing gas 5 causes the fines to be retained in the external heat exchanger for a period of time sufficient to give up their heat.

The fine particles can be made of the same materials as the coarse particles, but silica has been found to be particularly useful. The particle size of the fine particles is chosen to be successfully entrained at the superficial velocity of the primary air 2 but also to prevent backmixing into the dense bed when recycled through recycle leg 6 in the Figure. As described later, a particle size of $-40$ U.S. mesh is desirable and a range of $-50+200$ U.S. mesh is preferred with a coarse particle size of about $-6+12$ U.S. mesh. Larger "fine" particles would backmix and finer "fines" may pass through the cyclones and not be recycled. However, larger fines could be used if larger coarse particles were used in the dense bed. The relative size is the important factor in preventing backmixing.

In normal operation the combustor described may be used to completely burn sulfur-bearing fuels in the dense bed region I and to capture sulfur dioxide with limestone in region II which is also known as the freeboard region. However, in this operation undesirable nitrogen oxides are formed in the dense bed during combustion and are emitted in the waste gas stream. It is known to limit the excess oxygen or to burn fuels under fuel rich or substoichiometric conditions in order to limit nitrogen oxide formation but several problems have resulted in prior methods utilizing this approach, not the least of which was a decrease in sulfur capture.

The present invention proposes to reduce problems associated with co-removal of $NO_x$ and $SO_2$ from fuel combustion by creating two regions in a conventional multisolid fluidized combustor and operating the lower region in a fuel rich condition and the upper region in an oxidizing condition. The method further includes the recycle of at least a portion of the fine entrained bed particles into the upper oxidizing region for depressing the temperature therein. Backmixing of such recycled fines into the lower fuel-rich region may be prevented by maintaining a substantial size difference between the coarse dense bed particles and the fine entrained bed particles, thus eliminating the need for the orifice plate disclosed in our previous U.S. Pat. No. 4,154,581. The orifice plate can be used however if a lesser size difference between coarse and fine fractions is found necessary for other reasons.

In carrying out the invention the primary air ratio and the gas residence time are important variables. The primary air ratio as used herein means the ratio of the air introduced in the bottom of the combustor to fluidize the particles (total of the primary air 2 and any air used to inject fuel and other solids at 4 in the substoichiometric region) and the calculated stoichiometric air requirement for complete combustion of the fuel. The gas residence time as used herein shall mean the time interval for the gas to travel between a lower point and an upper point in the combustor. Mathematically, the gas residence time is equal to the distance between the two points divided by the superficial gas velocity.

If the only objective was to reduce $NO_x$ during combustion, it would be desirable to operate in a highly substoichiometric mode. But in normal, one-component fluid beds this would lead to several problems. One problem is the reaction of the sulfur sorbent, for example limestone, with the sulfur, yielding CaS. Under fuel-rich conditions this product would be drained from the fluidized bed as solid waste. Unfortunately, CaS is an environmentally undesirable waste and is particularly unsuitable for landfill disposal. Moreover, oxidation of the CaS before its exit from the fluidized bed is unsatisfactory due to short retention time and poor mixing.

Oxidation in a conventional one-component bed may also be catastrophic in that unburned fuel (especially fines) and carbon monoxide from the fuel-rich zone will burn uncontrolled in the oxidizing zone thereby promoting wide temperature excursions. The high temperature can be both a threat to construction materials and an enemy of sulfur dioxide capture since any sulfates are decomposed back to sulfur dioxide at about 1900° F.

The present invention therefore minimizes these problems in the following manner. Referring again to the drawing Figure, a lower region of the combustor marked "Reduction Region" is operated at substoichiometric conditions such that nitrogen oxides released during burning therein are reduced to gaseous nitrogen by char and carbon monoxide according to the following reactions:

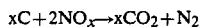

$$xC + 2NO_x \rightarrow xCO_2 + N_2$$

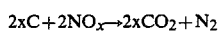

$$2xC + 2NO_x \rightarrow 2xCO_2 + N_2$$

Secondary air is then injected at a preselected point, for example at 9, to bring the oxygen to the desired level (preferably about 10–50% excess air over stoichiometric) in the "Oxidation Region". Sulfur sorbent may also be injected at points 4, 8, 9 or 10 or may be recycled through recycle legs 6 and 7 and to react with the sulfur and oxygen in the oxidation region to form disposable sulfate products. For example, fine limestone is injected at 9 with the secondary air and reacts with sulfur to form gypsum.

Combustion of unburned fuels also takes place in the upper oxidation region but temperature increases due to such combustion are depressed by recycling cool, fine particles from the entrained bed through cyclone 11, external heat exchanger 12 and recycle leg 6.

The lower reduction region may be operated at as low a temperature as will support combustion, typically about 1450° for coal and about 1650° F. for coke. This allows the primary air ratio to be reduced to as low as about 0.35. The lower the primary air ratio the lower is the emission level of $NO_x$. Preferably, the primary air ratio is controlled to about 0.4 to 0.6 (i.e 40-60% of theoretical stoichiometric air). The upper oxidation region is preferably operated at a temperature of about 1600°-1700° F. but at least below about 1900° F. where $CaSO_4$ decomposes.

The height of the reduction region is selected to allow sufficient residence time to reduce the $NO_x$ to the desired level. The higher the reduction zone, the longer the residence time and the less $NO_x$ will escape without reacting with char and carbon monoxide. Generally, the reduction zone is chosen to be the same height (above the distributor plate 3) as the dense fluidized bed I. Both the upper recycle leg 6 for the entrained bed particles and the secondary air inlet 9 could be at the same level just above the dense bed as shown in the drawing Figure. Likewise, the secondary air could actually be used to inject the recycle sand through leg 6 and thereby provide better distribution of the recycled particles across the combustor.

In the alternative, the recycle leg 6 and/or the secondary air inlet 8 could be located just below the upper boundary of the dense bed I such that the better mixing therein is used to distribute the recycled particles. If necessary for better reduction of $NO_x$, the secondary air inlet could be located substantially above the dense bed such as at location 10. The air inlets at 8, 9 and 10 may be used one at a time or in concert to control the height of the reduction region.

The height of the oxidation region is chosen to afford sufficient residence time for capture of $SO_2$ by the sorbent and the oxidation thereof. Clearly with a finite height of the combustor, a balance must be struck between the height of the reduction and oxidation regions by the placement of the secondary air inlet. Moreover, two or more secondary air inlets can be used, such as at locations 8, 9, and 10 in order to better control the temperature and oxidizing conditions over a large region.

Some of the entrained bed particles continue to be recycled through the dense bed via recycle leg 7 from the external heat exchanger. However, as earlier stated, the cooled particles are beneficially used to depress the temperature excursions in the oxidation region resulting from the burning of carbon monoxide and unburned fines coming from the reduction zone. Enough of the fine particles are recycled to maintain the temperature at a satisfactory level to protect construction materials and to promote sulfur dioxide capture and oxidation, preferably in the range of about 1600°-1700° F.

EXAMPLES OF THE PREFERRED EMBODIMENTS

Example 1

Staged Combustion of Petroleum Coke.

A multisolid combustor test unit was used to demonstrate the invention. The combustor column is made of Type 304 stainless steel pipe with a wall thickness of ⅛ inch. The bottom section is 5 feet in height (above the distributor plate) and has a 6⅜ inch I.D. which is expanded to 8¼ inch I.D. for the remaining 15 foot freeboard region of the combustor. A uniform diameter pipe has also been used but the expanded freeboard region provides longer gas retention time and better $SO_2$ capture. Thermal insulation around the combustor limits heat loss.

Secondary air inlets enter the combustor chamber at vertical locations 27 inches, 48 inches, 70 inches, and 105 inches above the distributor plate. The entrained bed particle recirculation system comprises a 12 inch diameter cyclone, an external heat exchanger and lower and upper solid recycle legs such as shown in the drawing Figure. The recycle legs enter the combustor chamber at vertical locations 2 inches and 48 inches above the distributor.

Other cyclones are installed in series for collecting fly ash. Fuel and the limestone sorbent are either premixed at a predetermined Ca/S ratio before feeding or are fed separately to the combustor at specified rates. A 1 inch diameter pneumatic injection line is used to introduce the fuel and limestone to the combustor at about 2 inches above the distributor plate.

Petroleum coke having a higher heating value of 15,300 BTU/dry lb was used as the fuel. It contained less than 3% moisture and was screened to $-8+50$ U.S. mesh before use. Chemical analysis was as follows:

| Component | Weight Percent (Moisture Free) |
|---|---|
| C | 89.50 |
| H | 3.90 |
| O | 1.82 |
| N | 2.64 |
| S | 1.82 |
| Ash | 0.32 |
| Volatiles | 10.5 |

Minus 325 Piqua limestone was used as sulfur sorbent. African iron ore ($-6+16$ U.S. mesh, 312 lb/ft³ density) and silica sand ($-20+70$, 162 lb/ft³ density) were used for the dense and entrained beds, respectively.

Operating conditions were as follows:

| | |
|---|---|
| Coke feed rate | 18–45 lb/hr |
| Dense bed temperature | 1680–1750° F. |
| Gas velocity in dense bed | 8–14 ft/sec (staged) |
| | 25–30 ft/sec (unstaged) |
| Primary air ratio under staged combustion | 0.32–0.67 |
| Ca/S ratio | 0 or 4.5 |

Cool entrained bed particles were not recycled through the upper oxidizing region in this trial. Coke particles which have a low once through combustion efficiency were recycled through the lower recycle leg with fine entrained bed particles in order to obtain total combustion effeciencies of greater than about 93%. Results of sulfur dioxide and nitrogen oxide emissions for several runs are given in Tables 1 and 2.

TABLE 1

SULFUR DIOXIDE EMISSIONS

| RUN ID | COMBUSTION MODE | Ca/S RATIO | SULFUR RETENTION % | SO$_2$ EMISSION LEVEL (PPM)[a] | SO$_2$ EMISSION RATE (LB/MILLION BTU) |
|---|---|---|---|---|---|
| 506 | Unstaged | 4.5 | 100 | 0 | 0 |
| 508 | Staged | 4.5 | 73 | 320 | 0.63 |
| 509A | Staged | 4.5 | 91 | 110 | 0.22 |

[a]Adjusted to 18 percent excess air.

TABLE 2

RESIDENCE TIME EFFECTS ON NITROGEN OXIDE EMISSIONS

| RUN NO. | PRIMARY AIR RATIO | RESIDENCE TIME (SEC) | EMISSION LEVEL (PPM NO)[a] | EMISSION RATE (LB NO$_2$/MILLION BTU) |
|---|---|---|---|---|
| 1 | 1.08 | 0.0 | 325 | 0.53 |
| 2 | 0.53 | 0.54 | 222 | 0.31 |
| 3 | 0.47 | 1.04 | 100 | 0.14 |
| 4 | 0.44 | 1.08 | 136 | 0.19 |
| 5 | 0.46 | 1.15 | 110 | 0.15 |
| 6 | 0.54 | 1.47 | 43 | 0.06 |

[a]Corrected to 18 percent excess air.

It is seen that the sulfur dioxide emissions increased somewhat under staged combustion but that nitrogen oxide emissions could be reduced from about 325 ppm down to less than 50 ppm by operating the lower region at substoichiometric conditions and increasing the gas residence time therein by decreasing superficial velocity. The secondary air was injected in all cases at the either 70 or 105 inch level.

The effects of varying the location of the secondary air injection and hence the relative height of said residence time in the reducing and oxidizing regions can be seen in Table 3.

TABLE 3

EFFECT OF SECONDARY AIR DISTRIBUTION ON SO$_2$ AND NO$_x$ EMISSIONS

| | AIR FLOW RATES AS FRACTION OF STOICHIOMETRIC AIR | | | | RATIO OF | | |
|---|---|---|---|---|---|---|---|
| RUN NO. | PRIM AIR | LOWER 2nd AIR (70″) | UPPER 2nd AIR (105″) | TOTAL AIR | LOWER AIR UPPER AIR | NO EMISSION PPM | SO$_2$ EMISSION PPM |
| 508E | 0.47 | 0 | 0.78 | 1.25 | 0 | 100 | 323 |
| 509A | 0.53 | 0.29 | 0.52 | 1.34 | 0.56 | 222 | 110 |
| 509B | 0.46 | 0 | 0.82 | 1.30 | 0 | 110 | 289 |
| 509C | 0.48 | 0.14 | 0.70 | 1.32 | 0.2 | 175 | 129 |

It is clear that the relative amounts of sulfur dioxide and nitrogen oxide emissions are directly affected by the height of the reducing and oxidizing regions. It is clear also from Tables 1-3 that both nitrogen oxide and sulfur dioxide emissions can be reduced by this staged combustion and by increasing the residence time in the reducing and oxidizing regions either through lower superficial velocities or lengthened combustor dimensions.

Example 2

Staged Combustion of Coal

Apparatus such as described in Example 1 was used except that the combustor was a uniform 6⅜ inch I.D. pipe and the cyclone and external heat exchanger were replaced with a 14 inch cyclone. Secondary air inlets were located at 28 inches, 44 inches, and 202 inches above the distributor plate. Illinois #6 coal (−6 U.S. mesh) analyzing 4% sulfur and 1.2% nitrogen was used as the fuel and −325 U.S. mesh Piqua limestone remained the sorbent. The results of several runs which are shown in Table 4 demonstrate the balance which can be used in injecting secondary air to optimize the emissions of nitrogen and sulfur. Excessive burning in the oxidation region together with high temperature excursions were noted during these runs.

TABLE 4

NO$_x$ REDUCTION

| | FRACTION OF STOICHIOMETRIC AIR | | | | | NO EMISSION | SULFUR |
|---|---|---|---|---|---|---|---|
| RUN NO. | PRIMARY AIR 0″ | 1 28″ | 2 44″ | 3 202″ | TOTAL | CORRECTED TO 18% EXCESS AIR (PPM) | RETENTION (PERCENT) |
| 113A | 1.32 | 0 | 0 | 0 | 1.32 | 168 | 100 |
| 113B | 1.25 | 0 | 0 | 0 | 1.25 | 286 | 100 |
| 113C | 1.03 | 0 | 0 | 0 | 1.03 | 209 | 95 |
| 113D | 1.15 | 0 | 0 | 0 | 1.15 | 212 | 97 |
| 113E | 0.42 | 0.32 | 0.18 | 0.19 | 1.11 | 105 | 96 |
| 113F | 0.43 | 0.33 | 0.19 | 0.20 | 1.15 | 107 | 96 |
| 113G | 0.54 | 0.17 | 0.16 | 0.17 | 1.04 | 79 | 79 |

Example 3

Staged Combustion with Recycle of Cooled Entrained Fines into Oxidation Region Excessive burning of carbon monoxide and unburned coke fines in the freeboard or oxidation region may cause elevated temperatures and potential damage to materials as well as reduced efficiency in the sulfur dioxide capture by the sorbent. In order to depress the temperature excursions in this example, cool entrained bed particles were recycled directly into the oxidation region.

The apparatus was similar to that described in Example 1. The fuel was petroleum coke and was fed at a rate of 36.9 pounds per hour into the combustor dense bed.

The coarse particle dense bed was made up of African ore with a size of $-6+12$ U.S. mesh. The entrained bed was made up of $-40$ U.S. mesh silica sand having a size distribution of:

| U.S. mesh size | Weight percent |
| --- | --- |
| $-20 + 40$ | 0.6 |
| $-40 + 70$ | 16.4 |
| $-70 + 100$ | 15.5 |
| $-100 + 200$ | 43.2 |
| $-200 + 325$ | 13.0 |
| $-325$ | 11.3 |

The fine entrained bed particles were cooled and recycled into the combustor through either upper recycle leg 6 or lower recycle leg 7 in the Figure. The upper recycle leg enters the combustor about 48 inches above the distributor plate in the oxidation region.

The combustion was staged by operating a lower region under substoichiometric conditions and then adding secondary air into the combustor above the dense bed to complete combustion and aid in sulfur capture efficiency. Primary air was used at 36.9 SCFM to fluidize the bed and secondary air was added as follows:

| Distance of inlet above distributor plate | Air Volume |
| --- | --- |
| 47" | 16.6 SCFM |
| 70" | 18.0 SCFM |
| 105" | 18.5 SCFM |

Under the above conditions the fuel was burned and heat withdrawn in the external heat exchanger. Temperatures of the dense bed (16 inches above the distributor plate) and of the oxidation region (232 inches above the distributor plate) were measured while varying the relative amount of cool fine particles recycled into the dense (reducing) bed and the freeboard (oxidation region). The results are shown in Table 5 and show that the dense bed can be maintained at a

TABLE 5
FREEBOARD TEMPERATURE CONTROL

| | 1 | 2 |
| --- | --- | --- |
| Opening of Fine Recycle Valve | | |
| Lower Recycle Leg | 30% | 25% |
| Upper Recycle Leg | 12% | 40% |
| Dense Bed Temperature | 1710° F. | 1711° F. |
| Oxidation Region Temperature | 1777° F. | 1624° F. | constant combustion temperature while the temperature of the freeboard or oxidation region may be controlled over a wide range by controlling the relative amount of cool fines which are recycled through the dense bed or directly through the oxidation region. By balancing these amounts we were able to reduce the temperature in the oxidation region about 150° F. while maintaining a constant temperature in the dense bed. This control can protect the construction materials in the freeboard region from thermal damage and can assure more efficient sulfur capture.

We claim:

1. A method of lowering nitrogen oxides to a desired level and minimizing sulfur dioxide in the reaction gases from the combustion of fuel in a multisolid fluidized bed having a lower dense fluidized bed of relatively large particles, an upper dispersed entrained bed of relatively fine particles recirculating through the dense fluidized bed and an entrained sulfur sorbent material therein, which comprises (A) operating a lower region of the multisolid fluidized bed under substoichiometric conditions such that $NO_x$ is reduced to the desired level, (B) operating an upper region of the multisolid fluidized bed above the substoichiometric lower region under oxidizing conditions to complete the combustion of the fuel, (C) maintaining a size difference between the relatively large particles and the relatively small particles such that substantially all of the former are at least about four times the size of substantially all of the latter, and (D) recycling a portion of the relatively fine particles through the lower region of the dense bed operating under substoichiometric conditions and a portion of the relatively fine particles from the entrained bed through substantially only the upper region which is operating under oxidizing conditions whereby to depress the temperature of such oxidizing region to a level conductive to sulfur capture by the sulfur sorbent material and to operate the lower region at as low a temperature as will support combustion.

2. The method of claim 1 wherein secondary air is injected into the combustor between the lower substoichiometric region and the upper oxidizing region.

3. The method of claim 2 wherein additional secondary air is injected into the combustor in the oxidizing region.

4. The method of claim 1 wherein the substoichiometric lower region comprises the dense fluidized bed.

5. The method of claim 4 wherein the lower substoichiometric region substantially coincides with the dense fluidized bed.

6. The method of claim 1 wherein the primary air ratio is between about 0.4 and 0.6.

7. The method of claim 1 wherein the dense bed particles are substantially about $-4+16$ U.S. mesh and the entrained bed particles are less than about 40 U.S. mesh.

8. The method of claim 7 wherein the dense bed particles are substantially $-6+12$ U.S. mesh and the entrained bed particles are substantially $-50+200$ U.S. mesh.

9. The method of claim 1 wherein the portion of entrained bed particles are recycled into the upper boundary of the dense fluidized bed such that distribution of the relatively fine particles is improved.

10. The method of claim 1 wherein secondary air is injected into the combustor above the substoichiometric region such that the combustion conditions are made more oxidizing and wherein entrained bed particles are injected into the combustor by the secondary air.

* * * * *